(12) United States Patent
Schwab

(10) Patent No.: US 9,205,566 B2
(45) Date of Patent: Dec. 8, 2015

(54) HEXAPOD

(76) Inventor: Martin Schwab, Obererlbach (DE)

(*) Notice: Subject to any disclaimer, the term of this patent is extended or adjusted under 35 U.S.C. 154(b) by 707 days.

(21) Appl. No.: 13/574,501

(22) PCT Filed: Jan. 20, 2011

(86) PCT No.: PCT/EP2011/050785
§ 371 (c)(1),
(2), (4) Date: Jul. 20, 2012

(87) PCT Pub. No.: WO2011/089198
PCT Pub. Date: Jul. 28, 2011

(65) Prior Publication Data
US 2012/0286123 A1 Nov. 15, 2012

(30) Foreign Application Priority Data

Jan. 22, 2010 (DE) .......................... 10 2010 005 586

(51) Int. Cl.
*F16M 13/00* (2006.01)
*B25J 17/02* (2006.01)
*B23Q 1/54* (2006.01)

(52) U.S. Cl.
CPC ............ *B25J 17/0266* (2013.01); *B23Q 1/5462* (2013.01); *B23Q 2210/006* (2013.01)

(58) Field of Classification Search
CPC .... B23Q 1/5462; B25J 17/0266; F16H 21/46; F16M 13/022
USPC .......... 248/346.06, 583, 584, 603; 74/490.06, 74/490.1, 490.9; 901/22, 23, 29
See application file for complete search history.

(56) References Cited

U.S. PATENT DOCUMENTS

| 5,538,373 | A  | * | 7/1996  | Kirkham ................... 409/131 |
| 5,987,726 | A  | * | 11/1999 | Akeel ...................... 29/407.08 |
| 6,099,217 | A  |   | 8/2000  | Wiegand |
| 6,196,081 | B1 | * | 3/2001  | Yau ........................ 74/479.01 |
| 6,530,688 | B1 | * | 3/2003  | Muller ....................... 378/197 |
| 7,685,902 | B2 |   | 3/2010  | Kock |
| 2001/0002098 | A1 |   | 5/2001  | Haanpaa |

(Continued)

FOREIGN PATENT DOCUMENTS

DE  102007051714 A1 * 5/2009
JP  58-180012        12/1983

(Continued)

OTHER PUBLICATIONS

English translation of Japanese examination report dated Sep. 17, 2013.

(Continued)

*Primary Examiner* — Gwendolyn Baxter
(74) *Attorney, Agent, or Firm* — Lucas & Mercanti, LLP

(57) ABSTRACT

A hexapod, comprising a preferably plate-shaped receptacle, on which at least five, preferably six, rods mounted in separate joints are arranged, wherein the other end of each rod is articulated on a mounting, wherein all the mountings can be moved along a path of movement, characterized in that each mounting (8) is arranged on a separate support (3). Either the respective mounting (8) is movable along the respective support (3) or the respective support (3) is movable together with the associated mounting (8), a support (3) being a ring or a ring section or having a two-dimensionally or three-dimensionally convoluted spatial form, defining a closed or open path of movement.

13 Claims, 17 Drawing Sheets

(56) References Cited

U.S. PATENT DOCUMENTS

Figure 1:
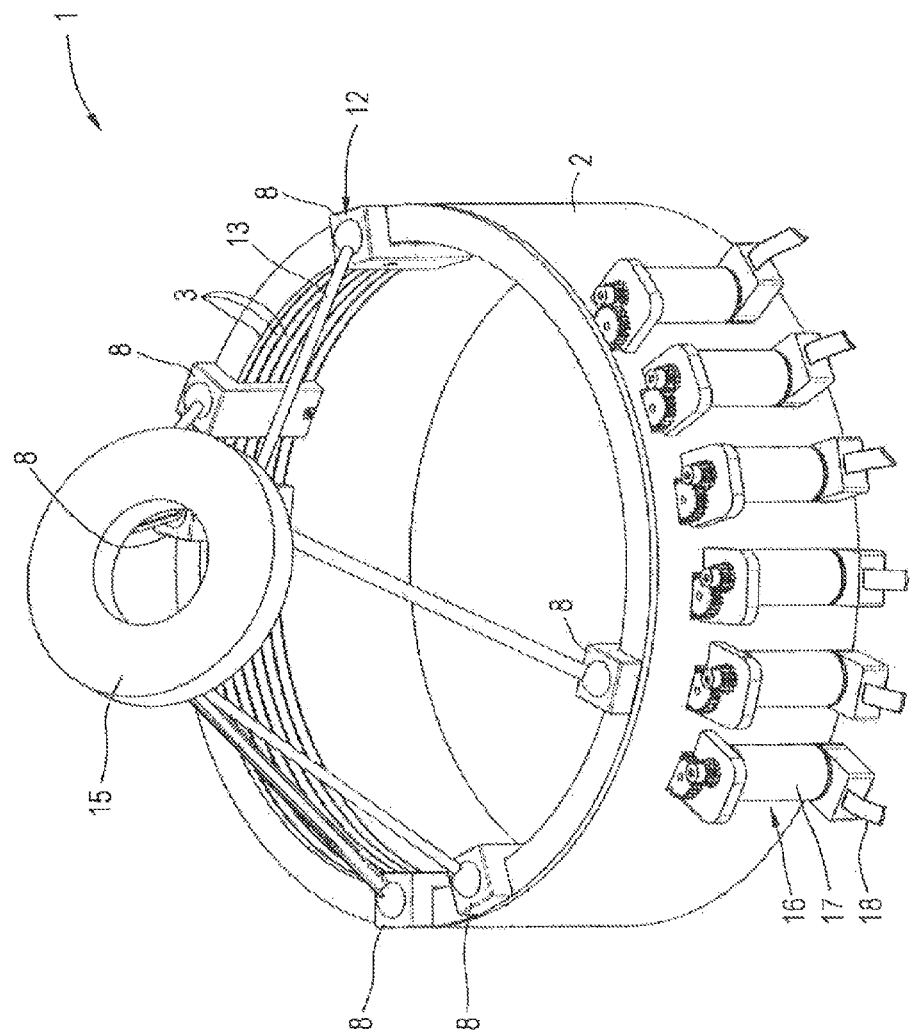

2002/0010465 A1* 1/2002 Koo et al. .................. 606/57
2008/0257092 A1 10/2008 Nihei

FOREIGN PATENT DOCUMENTS

| JP | 60-87684 | 5/1985 |
| JP | 2000-097306 | 4/2000 |
| JP | 2000-210831 | 8/2000 |
| JP | 2001-038551 | 2/2001 |
| JP | 2005-516784 | 6/2005 |
| JP | 2008-264904 | 11/2008 |
| WO | 2004033161 A1 | 4/2004 |
| WO | 2006133583 A1 | 12/2006 |

OTHER PUBLICATIONS

Chinese Patent Office examination report issued Nov. 15, 2014 with English translation.

* cited by examiner

HEXAPOD

CROSS-REFERENCE TO RELATED APPLICATIONS

This application is a 371 of PCT/EP2011/050785 filed Jan. 20, 2011, which in turn claims the priority of de 10 2010 005 586.7 filed Jan. 22, 2010, the priority of both applications is hereby claimed and both applications are incorporated by reference herein.

The invention concerns a hexapod, comprising a preferably plate-shaped receptacle, on which at least five, preferably six rods mounted in separate joints are arranged, wherein the other end of each rod is articulated on a mounting, wherein all the mountings can be moved along a path of movement.

A hexapod is a means of positioning or control by which it is possible to change the spatial position of any given object situated on the preferably plate-shaped receptacle. For this, the plate-shaped receptacle is articulated to at least five, preferably six rods of constant length, mounted in separate joints, wherein the other end of each rod is articulated on a mounting. Each mounting is arranged movably on a common circular rail, and so it can travel along the circular path of movement defined by the circular rail. Movement of the mountings necessarily changes the spacing of the rod ends articulated to them, while the spacing of the rods also necessarily changes the angles of the respective rods to each other and thus the spatial position of the rod joints located on the receptacle. In this way, all six degrees of freedom of the movable plate can be controlled. However, due to the guidance of the mountings on a common circular rail, the possible positions assumed are limited, and special positioning tasks cannot be accomplished with such a hexapod.

Thus, the problem of the invention is to indicate an improved hexapod.

To solve this problem, for a hexapod of the kind mentioned above, the invention specifies that each mounting is arranged on a separate support, and either the respective mounting is movable along the respective support or the respective support is movable together with the associated mounting, where a support is a ring or a ring section or has a two-dimensionally or three-dimensionally convoluted spatial form, defining a closed or open path of movement.

In the invented hexapod, the "rigid" tying of the mountings to only a single circular-path support that is known from the prior art is eliminated. According to the invention, each mounting is arranged on a separate support, that is, there are at least five, preferably six, separate pairs of mounting and support. This yields two different movement options for the moving or positioning of the receptacle. According to the first alternative of the invention, the respective mounting can be moved along the respective support. That is, the mounting moves along the respective support in the manner of a truck or carriage. The second alternative calls for moving the respective support along with the mounting which is then firmly arranged on it, thus moving the support in space, resulting in a positioning of the rod.

The "decoupling" of the mountings by assigning or arranging them each on a separate support specific for the mounting enables any desired design of the particular mounting-specific support in its geometry or spatial arrangement. For unlike the prior art, in the hexapod of the invention a circular-path support no longer needs to be provided or used. Instead, depending on the required positioning task to be performed with the hexapod, one can readily employ supports of different geometrical design, so that any desired spatial paths of movement of the individual mountings result, depending on the geometry of the support. This necessarily means that the most diverse movements of the receptacle can be implemented. But the hexapod of the invention equally enables the use of supports of identical geometry, even supports in the shape of a circular ring, each of them carrying a mounting and being necessarily arranged staggered from each other in space. That is, ultimately, with the hexapod of the invention, any desired geometrical configurations and spatial arrangements of the individual supports relative to each other are possible, yielding a great variability in terms of the design of the hexapod and the handling of the most diverse positioning tasks. This is shown not least by the fact that as may be provided for in accordance with the invention, the supports can be arranged in the same horizontal plane, in parallel horizontal planes, or tilted relative to each other, and of course any desired "mixed" support arrangements in space are also possible. That is, supports of any given geometry (such as ring, ring section, many-curved supports) can be positioned alongside each other in the same horizontal plane, or arranged with a vertical offset in parallel horizontal planes. In addition, it is also possible to position the supports in a tilted position relative to each other. That is, ultimately, any given possibilities of arranging the supports in space are granted.

As described, supports of any given geometry can be used. A preferred support design is that of a ring. For example, it is possible, when using six rods, to use six separate rings, each one carrying a mounting, being arranged for example vertically one above another in parallel horizontal planes. Either the individual mountings can move on the rings fixed in position, or the rings are individually movable along with the mountings; in this case, they can turn about a common axis of rotation. Alternatively to the ring shape, it is also possible to design a support as a ring section. Such a ring section can extend, for example, over an angle of 120° or 180°. These ring sections can also be distributed in any given manner in space, for example (comparable to the exemplary embodiment with the rings arranged one above another) they can be arranged vertically one above another in horizontal planes lying one above another, being arranged with staggering from each other in the peripheral direction. Other spatial distributions in other planes or the like are also conceivable. Finally, each support can also have a two-dimensionally or three-dimensionally convoluted shape, and thus be convoluted in the manner of a "spline".

An especially preferred embodiment calls for arranging the rings or ring sections concentrically one above another, that is, positioning them in parallel horizontal planes one above another, wherein they can then turn about a common central axis of rotation. But it is also conceivable to arrange them all lying concentrically within each other in the same horizontal plane, i.e., when using six rings for example, to position these lying concentrically within each other. Here again, the rings can turn about a common central axis of rotation. A combination of both arrangement alternatives is also possible, so that the rings or ring sections are arranged vertically and radially staggered from each other, thus yielding an arrangement that is tiered from top to bottom, for example.

Another problem with a known hexapod, as described in the introduction, and which thus has a common circular ring path on which all the mountings are movably guided, is that each mounting is connected to its own driving means, i.e., its own drive motor, which is moved along with the mounting. This means that not only the mountings, but also their drive motors, are moved along the circular ring rail, and these will mesh by a gear mechanism with a corresponding circular ring rail toothing, for example. Since each drive motor is connected with a cable, when the receptacle is rotated by 360°, which is quite possible, and all mountings thus travel through 360° on the circular path, the cables will get coiled up. That is, the possibility for 360° turns is limited. To remedy this, an especially advantageous modification of the invention calls for each movable support or each movable mounting to be separately movable by its own stationary driving means, or for two supports or mountings to be coupled together in movement, especially by a preferably shiftable transmission, so that they can move via a shared stationary driving means. Thus, in the hexapod of the invention, the driving means such as a drive motor or servo-motor is stationary and consequently not moved. It is coupled in suitable manner with the movable support or the movable mounting, as shall be discussed further below. Nevertheless, it is stationary regardless of the infinitely complex movement of the support or mounting, and so does not move along with them. As a result, any desired movements are possible, without the danger of cable coiling. This is of special advantage particularly in the configuration of the invented hexapod with six ring paths, i.e., circular rings lying one within another or standing one above another. For this configuration enables a 360° turning of the hexapod or the receptacle, and infinitely many 360° turns of the invented hexapod are possible without danger of cable coiling.

There are two different configurations that are conceivable in this case. According to the first one, each support or each mounting can move separately by its own driving means, i.e., its own motor. In this case, thus, six stationary drive motors are provided. But it is also conceivable according to the second alternative to couple two supports or two mountings together in movement so that they can be moved by a common stationary driving means. In this case, thus, only three servo-motors would be provided, while each servo-motor accomplishes the movement of two supports or mountings. The motion coupling can be done, for example, through an intervening transmission, which can also be shiftable, for example, in order to disengage one support or one mounting from the movement when it is supposed to move separately. The transmission can be such that the supports or the mountings can be moved in opposite directions, or in the same direction.

To enable the movement of the supports, according to one modification of the invention each movable support can have a toothing, which meshes with a takeoff element driven by the stationary driving means, i.e., the stationary motor. This takeoff element can be, for example, a pinion or a spindle, while the motor is coupled either directly to the pinion or the spindle, or it is coupled to it by a flexible drive shaft, for example, and arranged externally. Instead of a pinion or a spindle, a belt or chain drive is also conceivable, that is, each movable support has a belt, e.g., in this case a toothed belt wrapped around it, which is driven by the stationary motor. Thus, a direct motion coupling can be realized, via pinion or spindle, or an indirect one via a belt or a chain.

In the case of circular rings or ring sections lying concentrically one above the other, one expedient modification of the invention calls for having the toothings on the outside or inside. Consequently, the driving means, or servo-motors, are located outside or inside the layout of concentric rings or ring sections. In the case of rings or ring sections lying in one horizontal plane, the toothing is located preferably on the underside, so that consequently the servo-motors are also situated in this area. If the support is not round, e.g., an oval support or one describing any given spatial curve, it is possible when using a belt drive to turn it about a central axis, in which case the belt is then wrapped around the support on the outside.

If the mounting can move along the support, it is advisable to move it with a traction means led along the support and coupled to a motor. Such a traction means can, once again, be a belt or a chain, arranged for example inside the hollow support. A movable mounting in this case is configured, e.g., as a carriage, which is movably guided on the support by rollers, other roller bearings, or else sliding bearings, and connected by a suitable coupling to the belt or the chain.

In order to ensure the mobility of the supports, the invention moreover calls for placing the movable supports, especially rings or ring sections, via bearing means, on one or more stationary structural parts, or to have them be movable relative to each other by bearing means arranged between them. Basically all possible kinds of bearings are conceivable here, as long as they enable the separate movement of the individual supports. Ball bearings, roller bearings, sliding bearings, pneumatic bearings, magnetic bearings, etc., can be used, being designed according to how the supports are mounted and able to move relative to each other.

The movable supports, especially the rings or ring sections, can in a first alternative of the invention each have a bearing arm, and all bearing arms are mounted via bearing means on a common central pillow block. For example, if the supports are rings, then each ring has a bearing arm extending inward to the center of the circle, where all bearing arms of the, say, six rings are mounted on a common central pillow block via suitable rolling bearings. However, the circular shape of the ring is not a prerequisite. Instead, this type of bearing is in principle possible for all shapes of supports. The supports can be arranged in different horizontal planes, e.g., lying vertically one above another. But it is also conceivable to use such a central pillow block for ring supports lying in the same horizontal plane, and then the bearing arms are designed with a corresponding angle in order to lead them to the central pillow block.

When the hexapod is designed with concentric rings of the same diameter, it is possible to mount these, as a further bearing alternative, with their outsides on at least three pillow blocks by respective bearing means at the block side. The rings are arranged one above another; radially inside or outside the ring layout are three equally spaced pillow blocks with corresponding bearing means on which the rings roll. A simple bearing layout can also be accomplished in this way. Alternatively, there is the possibility of also placing the bearing means between the individual rings, for example, in the form of axial bearing races with any desired shapes of rolling elements.

Finally, it is advisable to provide a common control mechanism, one that controls all driving means and enables a highly precise positioning of the individual mountings, whether by moving the respective supports or by moving the mounting itself, in order to be able to set the desired positions of the receptacle. However, it should be mentioned here that basically and especially when the hexapod is configured with rings arranged vertically one above another, a manual mobility of the rings can also be provided, insofar as they are movable, or of the mountings, insofar as these can move along the rings.

Figure 2:
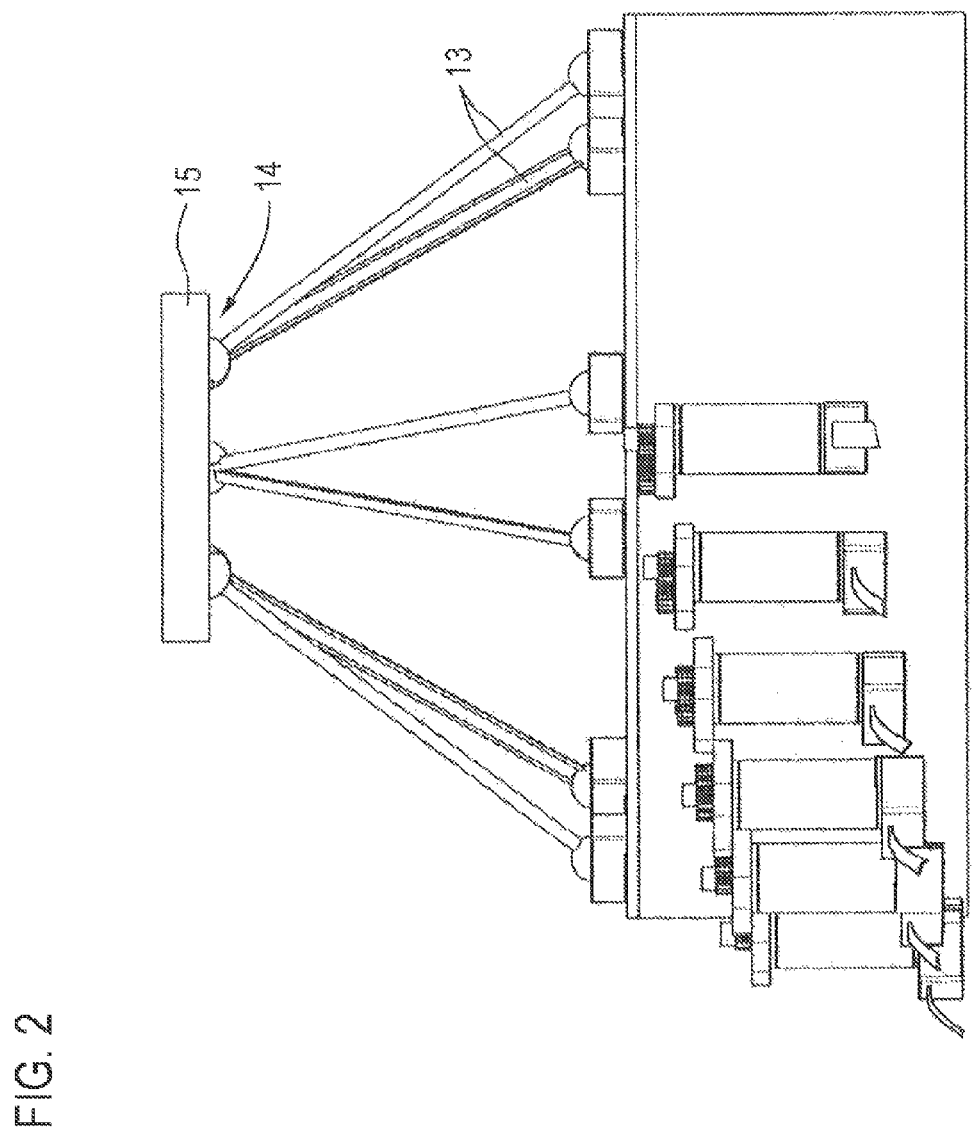
Figure 3:
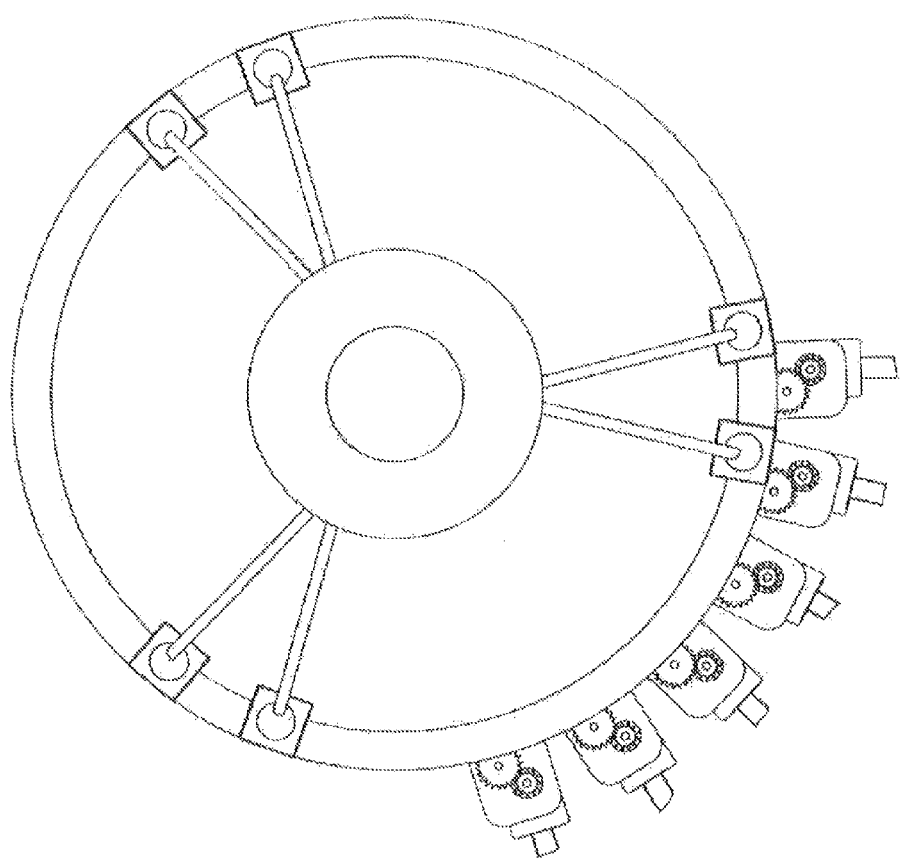
Figure 4:
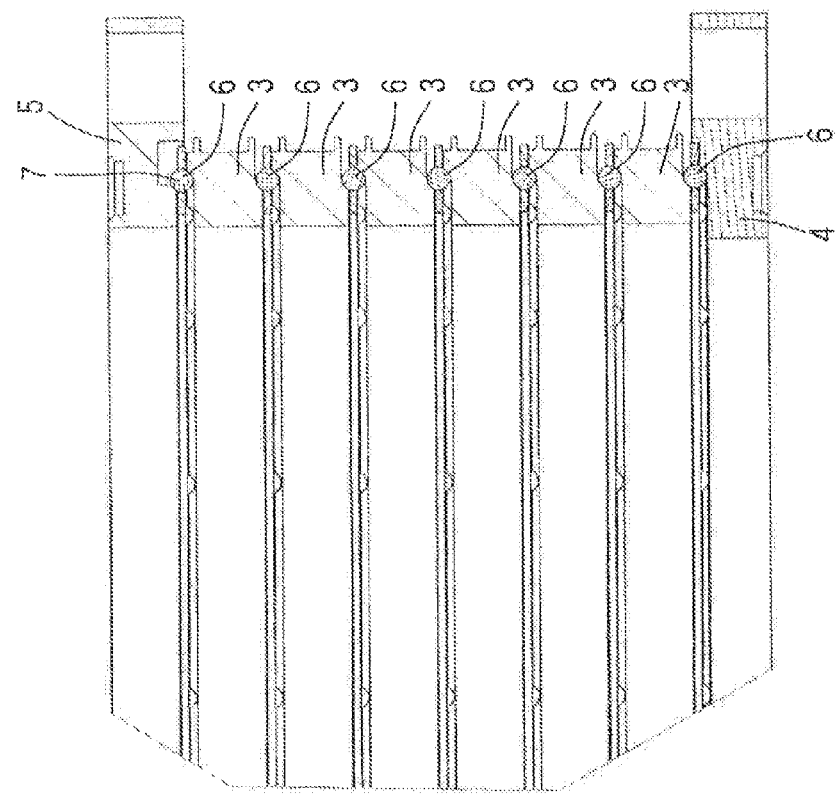
Figure 5:
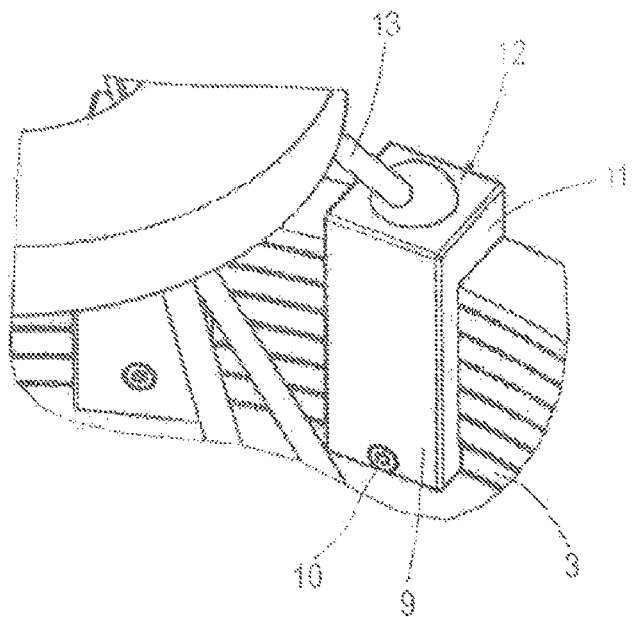
Figure 6:
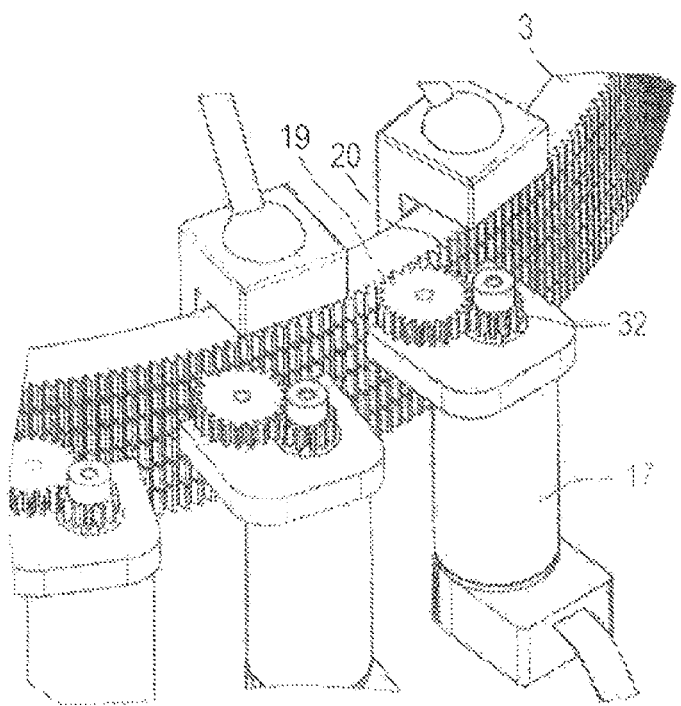
Figure 7:
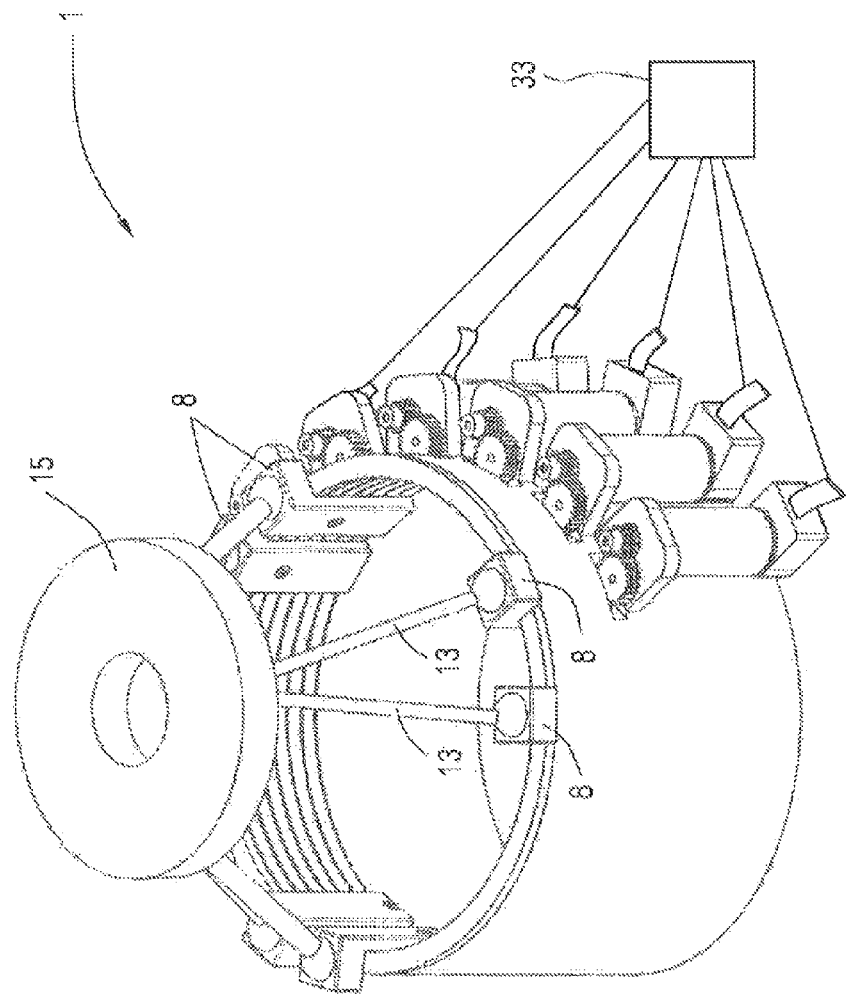
Figure 8:
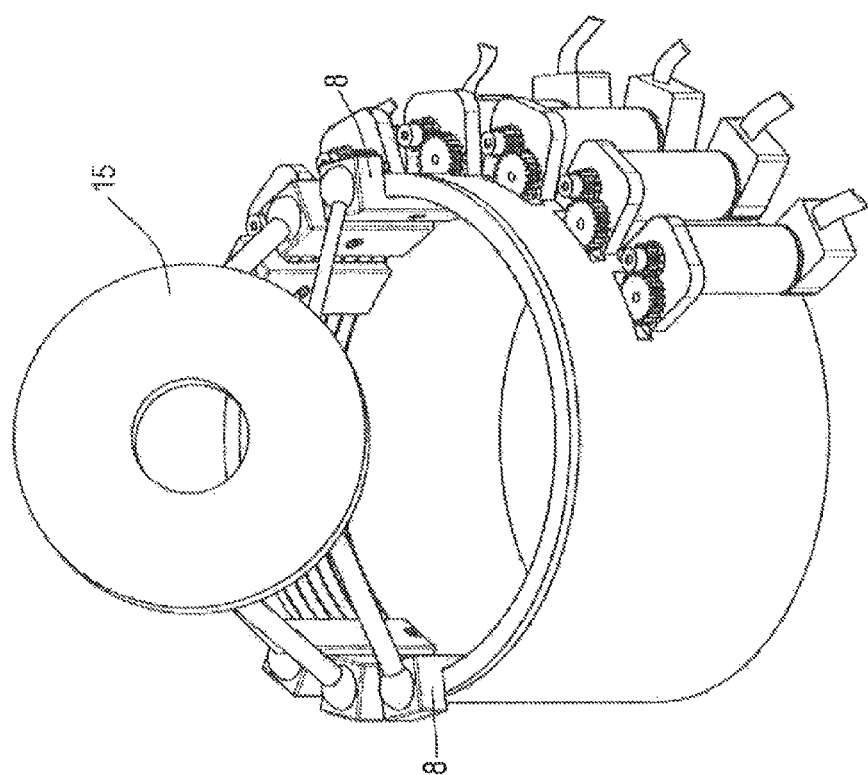
Figure 9:
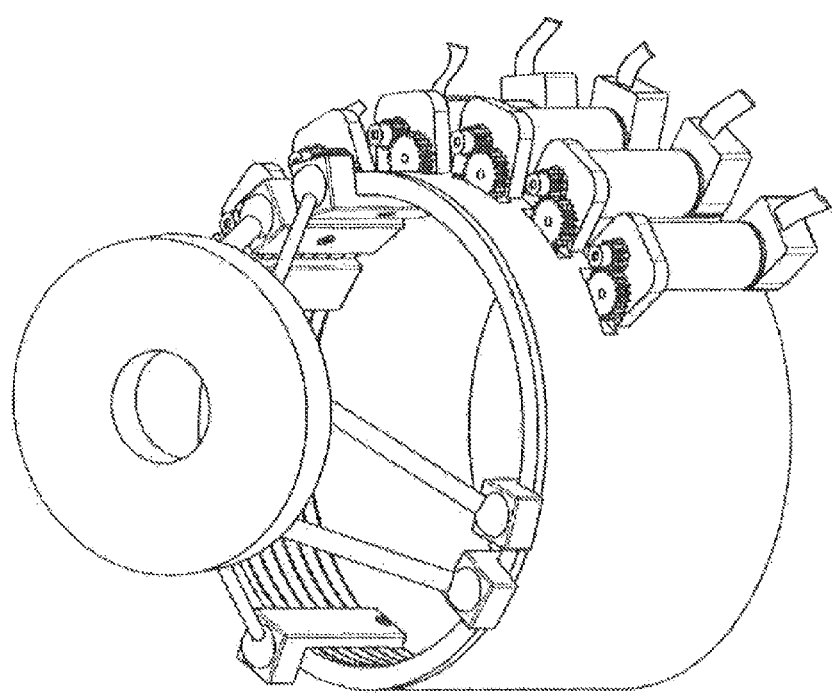
Figure 10:
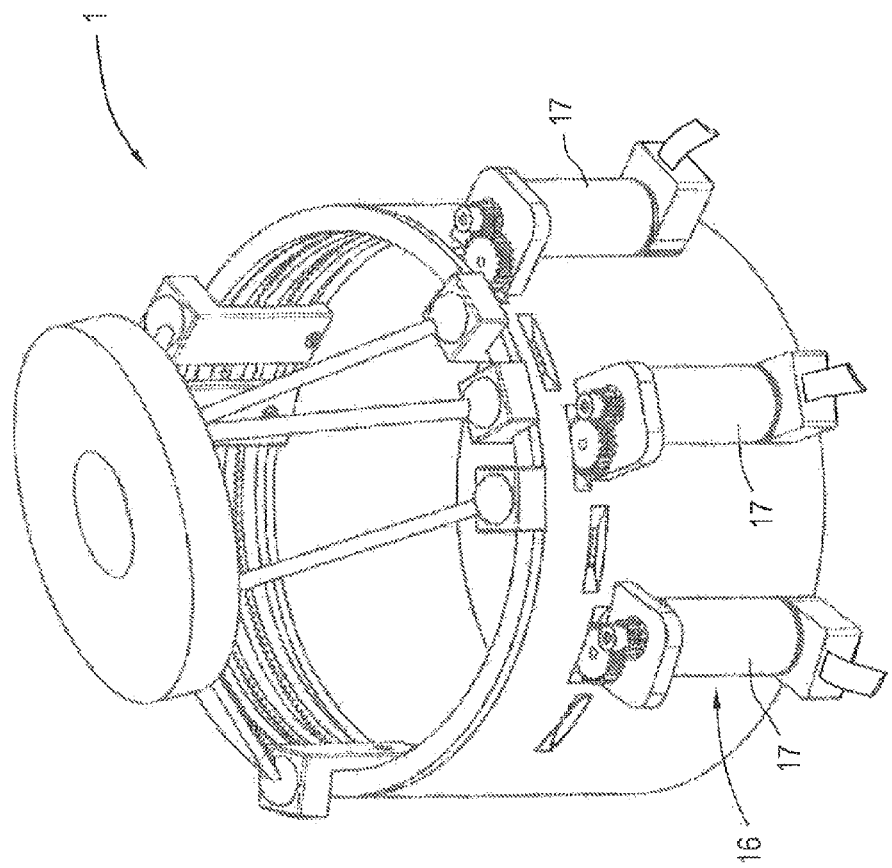
Figure 11:
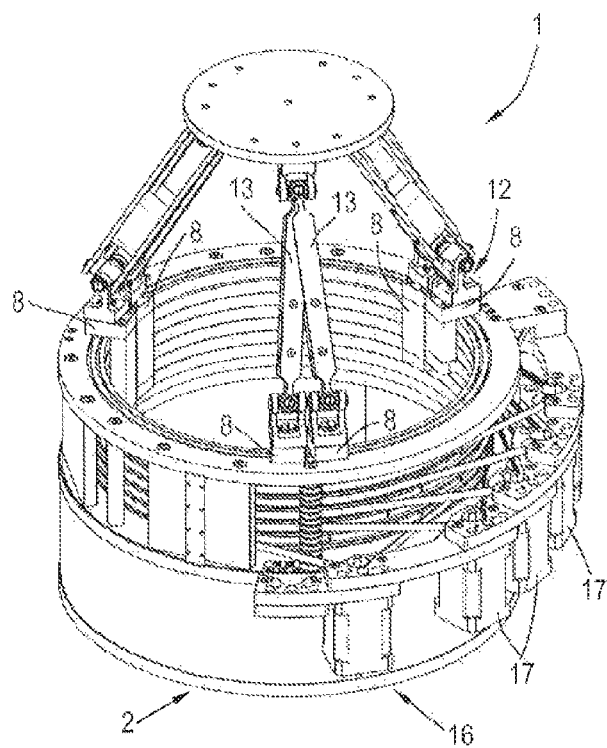
Figure 12:
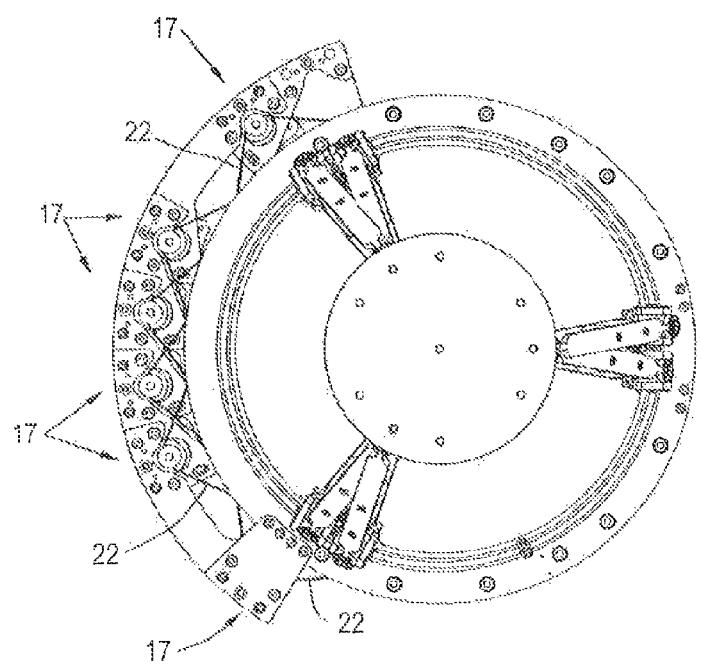
Figure 13:
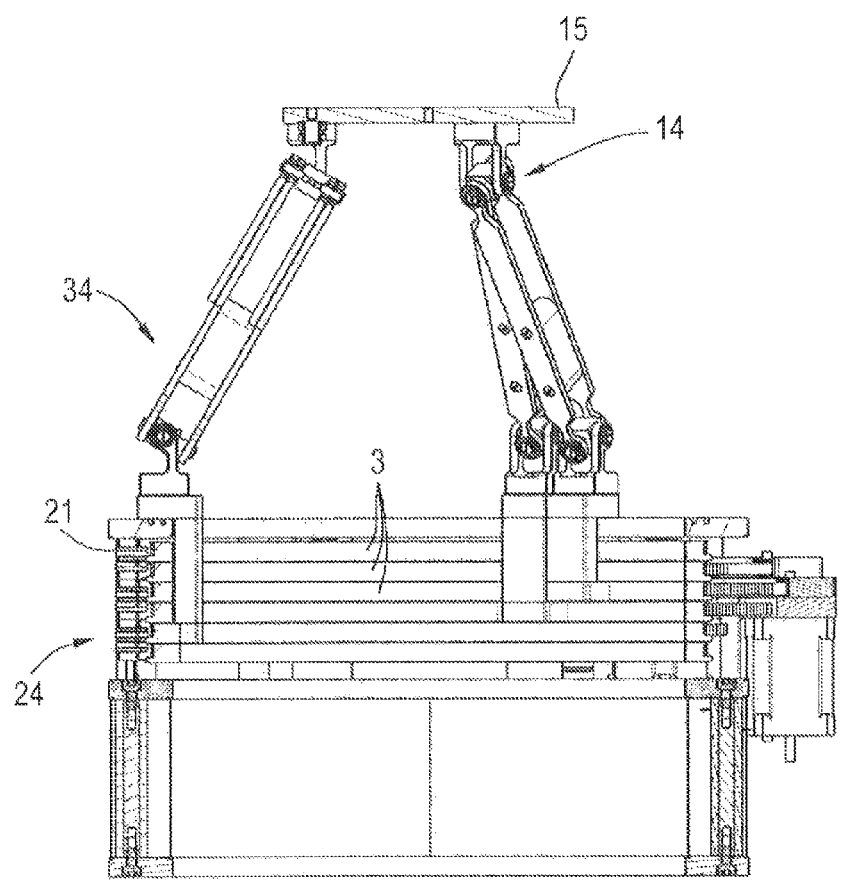
Figure 14:
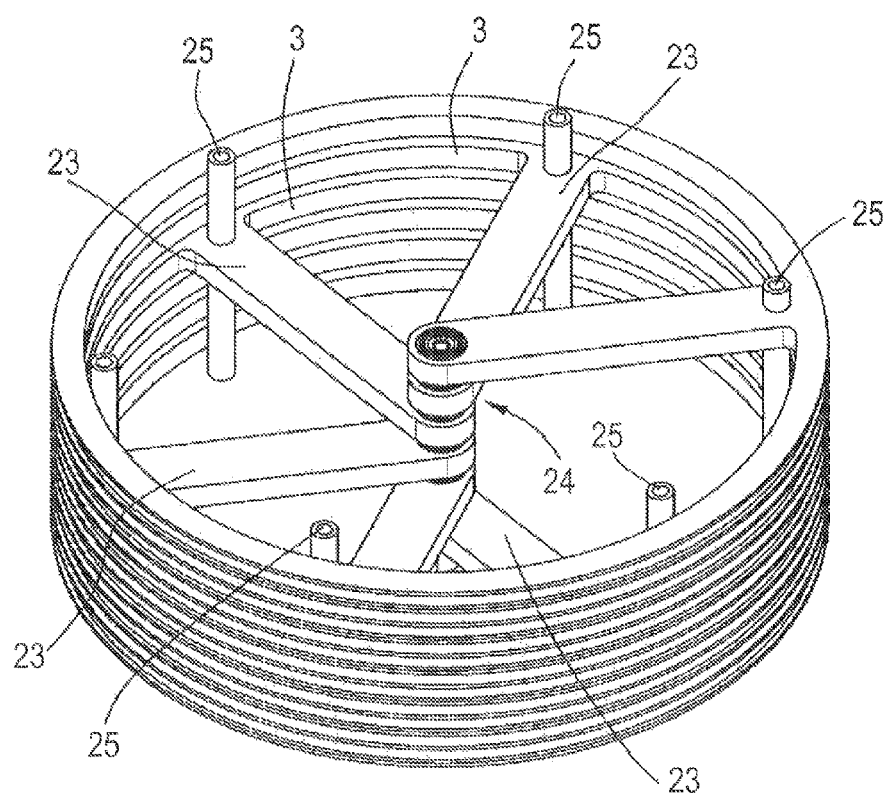
Figure 15:
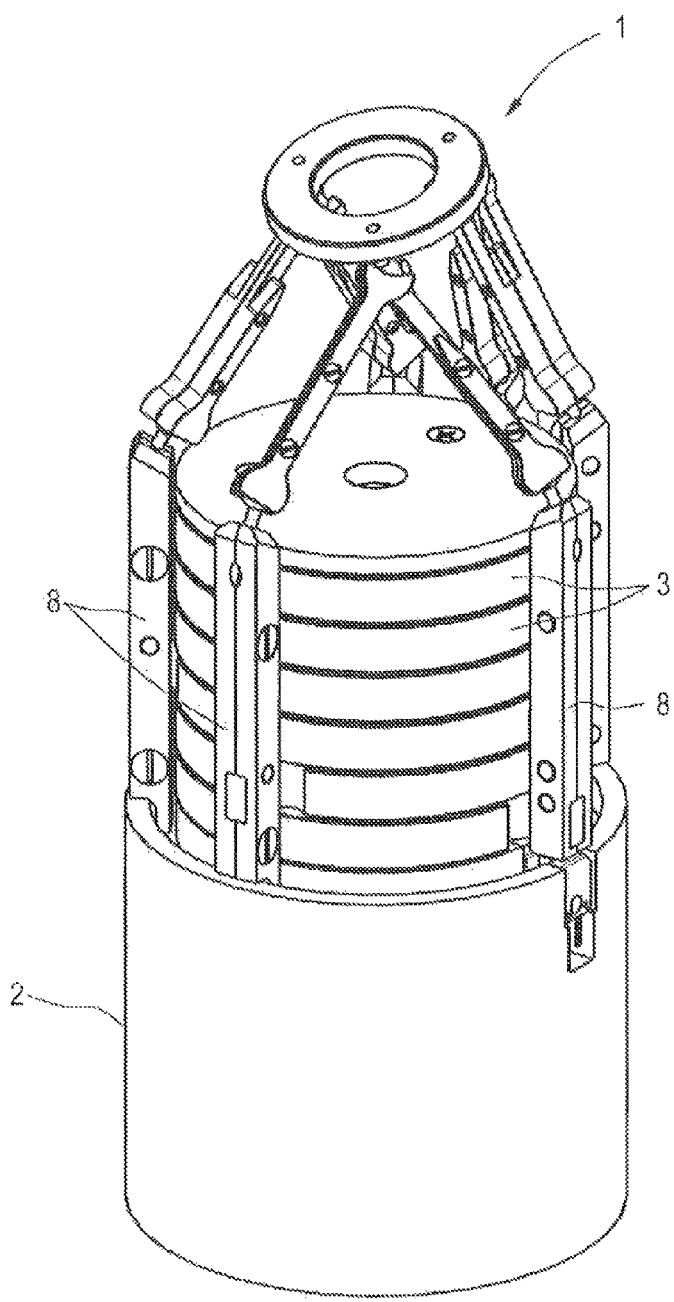
Figure 16:
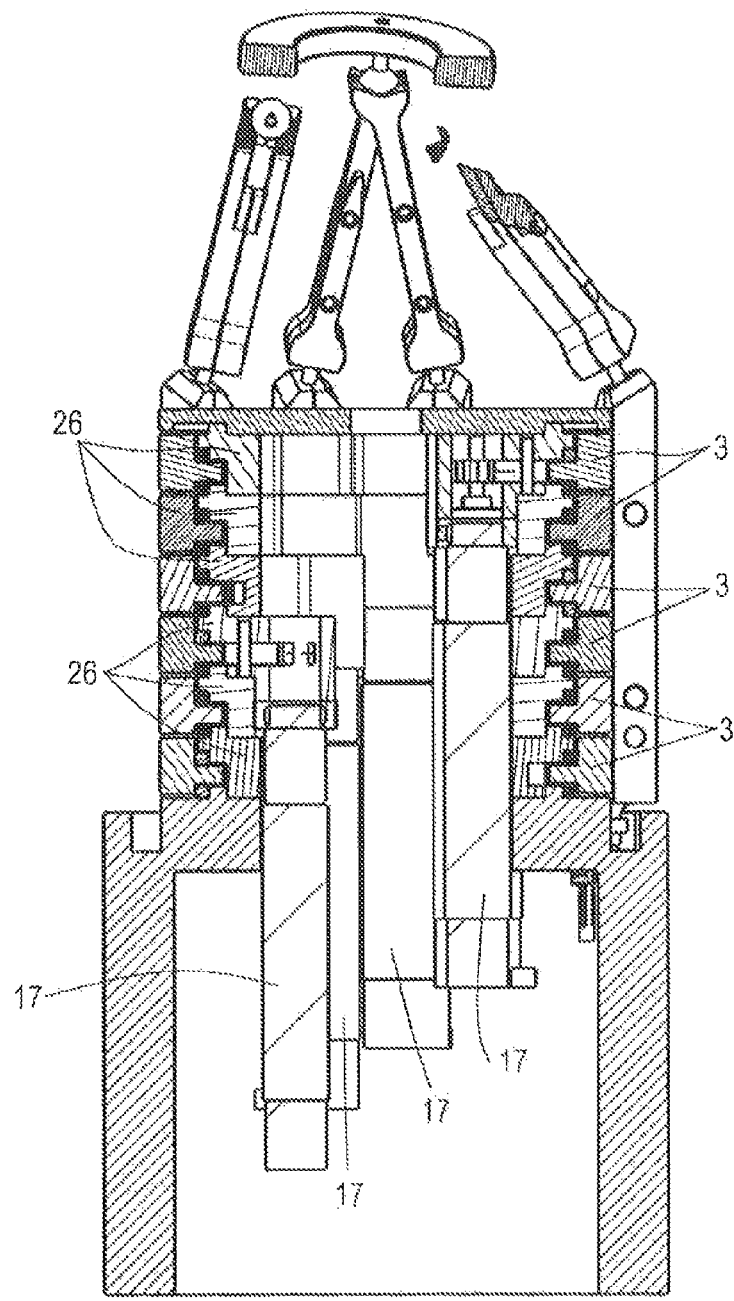
Figure 17:
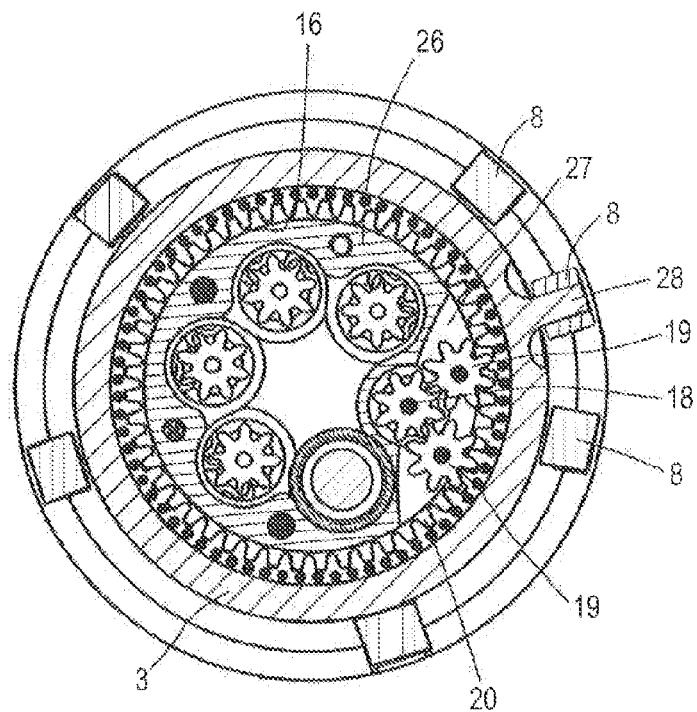
Figure 18:
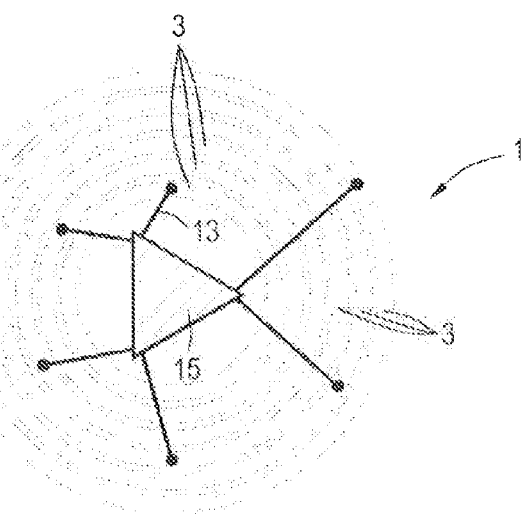
Figure 19:
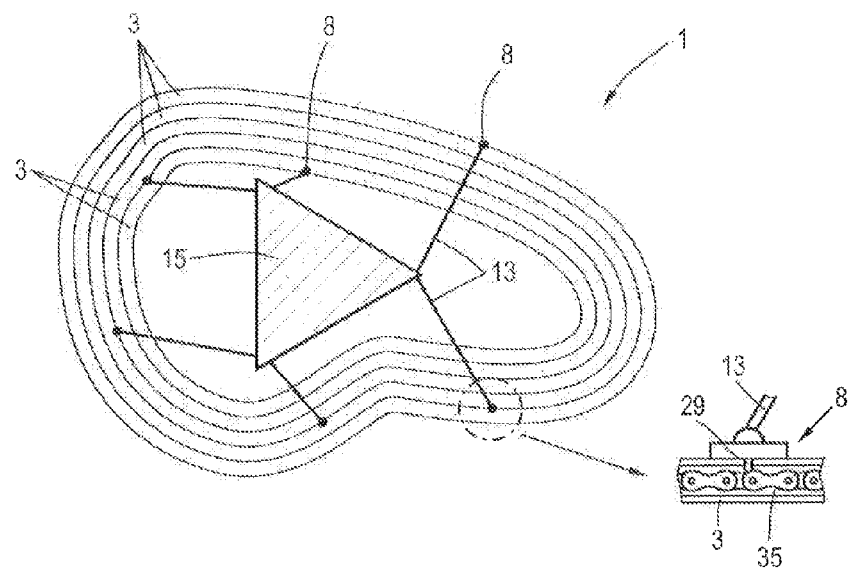
Figure 20:
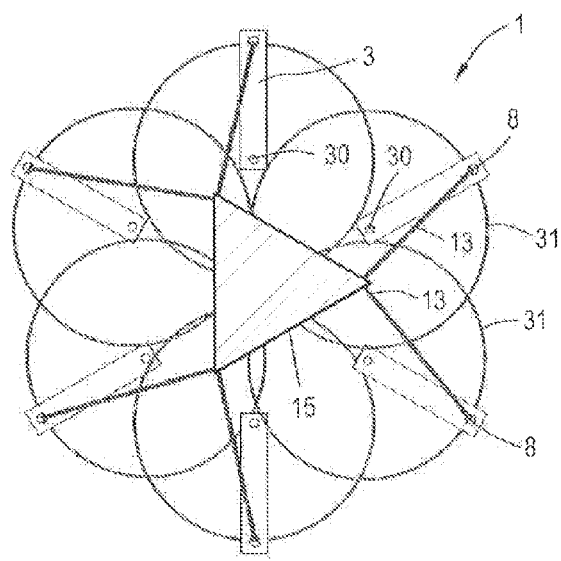
Figure 21:
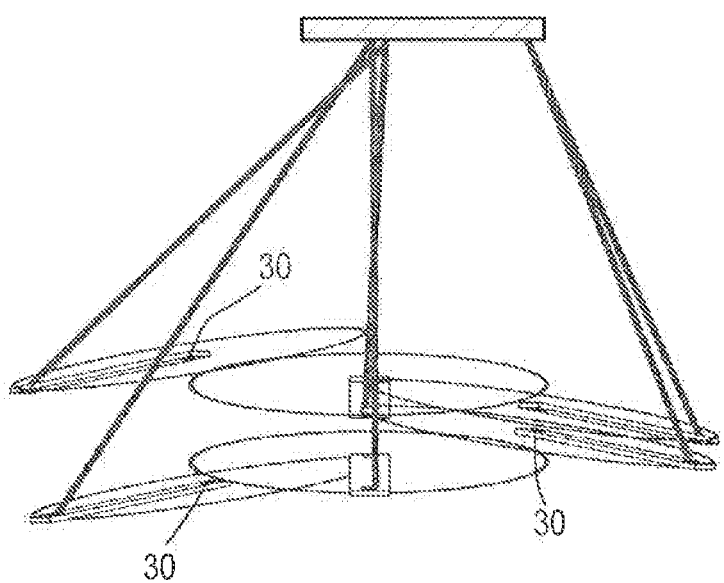

Further advantages, features and details of the invention will emerge from the below-described example embodiments, as well as the drawings. There are shown:

FIG. 1, a perspective view of a hexapod according to the invention, in a first embodiment, FIG. 2, the hexapod of FIG. 1 in a side view, FIG. 3, the hexapod of FIG. 1 in a top view, FIG. 4, a detailed feature to show the bearing of the individual supports, FIG. 5, a detailed feature to show the arrangement of a mounting on a support, FIG. 6, a detailed feature to show the drive mechanism of the individual supports, FIGS. 7 to 9, different views of the hexapod of FIG. 1 with different positions of the receptacle, FIG. 10, a perspective view of a hexapod of a second embodiment, with pairwise motion-coupled supports, FIG. 11, a perspective view of a hexapod according to the invention, in a third embodiment with belt drive, FIG. 12, a top view of the hexapod of FIG. 11, FIG. 13, a side view of the hexapod of FIG. 11, FIG. 14, a partial view of one bearing option for the ring-shaped support according to another embodiment of the invention, FIG. 15, a perspective view of a hexapod according to the invention, in a fourth embodiment with interior drive system, FIG. 16, a sectional view through the hexapod of FIG. 15, FIG. 17, a top view of the hexapod of FIG. 15 in cross section to show the interior drive system, FIG. 18, a diagram of a hexapod according to the invention, in a fifth embodiment with concentrically arranged supports lying one inside another in a horizontal plane, FIG. 19, a diagram of a hexapod according to the invention, in a sixth embodiment with supports describing any given path contour, FIG. 20, a diagram of a hexapod according to the invention, in a seventh embodiment with crank-borne supports that are axially staggered relative to each other and describe paths that are tilted in space, and FIG. 21, a side view of the hexapod of FIG. 20.

FIG. 1 shows a hexapod 1 according to the invention in a first embodiment, comprising an outer cylindrical housing 2, in which a total of six separate supports 3 are accommodated and able to turn about a common axis of rotation (see especially FIG. 4) in the example embodiment shown. The supports 3 are configured as rings, which are arranged vertically one above another in parallel horizontal planes. They are held as a rotary bearing between a lower bottom plate 4, such as a ring-shaped one, and an upper top race 5. For this, bearing means 6, in the form of rolling bearings 7 (axial bearings) in the example shown, are arranged between bottom plate 4 and the adjacent support 3, between the individual supports 3, and between the upper support 3 and the top race 5. In this way, each support 3 can turn separately relative to an adjacent support or one of the adjacent plates.

Each support 3 is firmly joined to a mounting 8, so that the mounting is moved with the support along a circular path upon a rotation of the support 3. The mountings have an L-shape in cross section, they have an inner fastening segment 9 (see FIG. 5 for this) by which they are joined by a fastening screw 10 to the particular support 3. The transversely or horizontally situated top segment 11 is located above the upper top race 5, and so it overlaps this with play. On each segment 11 of a mounting 8 there is provided a joint 12, a ball joint in the example shown, in which a rod 13 is articulated. Each rod 13 is in turn articulated by its upper end in a joint 14 on a receptacle 15, on which any given object to be positioned with the hexapod 1 (such as a tool or the like) can be arranged; here as well a ball joint is shown as an example. It should be pointed out already in this place that instead of the ball joints shown, of course, any other joint can also be used that enables a free mobility in space.

In order to be able to move the individual supports 3 and, thus, the individual mountings 8 separately about the central axis of rotation, each individual support 3 is matched up with a separate driving means 16 in the form of a servo-motor 17.

The servo-motors 17, see FIG. 1 for example, are arranged stationary on the cylindrical housing 2. That is, they do not move when the mountings 8 are moved to adjust the position of the receptacle 15. For this, the servo-motors 17 are coupled each via a takeoff pinion 18 and an intervening gear 19 to an external toothing 20 of the respective support 3, see FIG. 6. It is clear from this figure that each support 3 has an external toothing, with which the intervening gear 19 of the respective servo-motor 17 engages. In this way, the support position and, by it, the mounting position can be very accurately adjusted, by which the respective spatial position of the coupled rod 13 and in turn through that the spatial position of the coupled receptacle 15 is changed.

The hexapod 1 of the invention makes possible, with its six separate driving means 16, control of a total of seven degrees of freedom. On the one hand, the receptacle 15 can be displaced in the horizontal plane about the X axis and rotated to a limited extent about the X axis. Likewise, the receptacle 15 can be displaced in this horizontal plane about the Y axis and rotated to a limited extent about the Y axis.

Furthermore, the receptacle 15 can also be displaced about the vertical Z axis, but on account of the stationary arrangement of the driving means 16, which therefore cannot be moved and consequently their cable supply lines 18 cannot be coiled up, it can rotate without limit about this receptacle-based Z axis (which thus vertically intersects the flat receptacle 15). In addition, however, the receptacle 15 can also be turned as often as desired about the central vertical Z axis of the hexapod, about which all of the supports 3 thus rotate. That is, two unlimited 360° rotations about two different Z axes, namely, on the one hand the receptacle-based Z axis, on the other hand the central Z axis of the hexapod itself, are possible. Both rotations are possible without limit solely via the six driving means, since these do not move and consequently neither does a coiling of the cable supply lines 18 occur. However, the full rotation of the receptacle 15 about its own Z axis is not possible in all possible positions of the receptacle 15, since there is a limit to the travel bounds of the six mountings 8. However, an unlimited 360° rotation is easily possible if the receptacle 15 is not tilted too much from the horizontal. On the other hand, the rotation about the central axis of rotation of the hexapod itself is possible in every position of the receptacle 15, since all six mountings 8 are moved with the same motion profile, that is, all supports 3 are moved homogeneously with the same velocity or acceleration.

FIGS. 7-9 show various positioning examples of the receptacle 15 of a hexapod 1 as described. In FIG. 7, two mountings 8 of two rods 13 that are mounted next to the corresponding joints of the receptacle 15 are moved relatively close to each other, while the three pairs of mountings in the example shown are spaced basically equidistant from each other, so that the receptacle 15 is situated basically in a horizontal position.

From here, the receptacle 15 was brought into the greatly tilted position shown in FIG. 8, by moving only the front two mountings 8 shown in FIG. 7 in opposite directions, so that ultimately there are basically two groups formed, each comprising three mountings 8, as is clearly shown in FIG. 8.

In order to be able to lift the receptacle 15 slightly again, yet once more adjust it in its spatial position as regards its own flat plane, two mountings 8 of the triplet shown at left in FIG. 8 are moved to the right, starting from FIG. 8, as shown in FIG. 9. This brings about a raising with dislocation of the plane of the receptacle. It is apparent from these few examples that the hexapod of the invention can be used to adjust any desired spatial positions of the mounting 15. By appropriate actuation of the driving means 16 from a shared control mechanism 33, shown as an example only in FIG. 7, one can also make possible all displacement or rotational movements, as well as the described 360° rotations, especially the unlimited rotation of the receptacle 15 about the central axis of rotation.

FIG. 10 shows another hexapod according to the invention, where the same reference symbols are used as much as possible for the same structural parts. The hexapod 1 of FIG. 10 basically corresponds in its construction to the hexapod of FIGS. 1-9. However, here only three driving means 16 are provided in the form of servo-motors 17, and two supports 3 can be driven by each servo-motor 17. For this, a shiftable transmission, not otherwise shown, is placed between each servo-motor 17 and the two coupled supports 3, and can be actuated separately via the control mechanism 33 (see FIG. 7, one of these is present, of course, in each embodiment). Such a shiftable transmission enables, on the one hand, a simultaneous movement operation of the two coupled supports, that is, these can be moved at the same time either in the same or in opposite directions. Furthermore, the transmission can also be designed to be shiftable, so that when necessary one support is disengaged and only the other support can be moved in any desired direction by the servo-motor 17 and vice versa. With such a design, one can save on motors, and especially when the individual supports can also be driven separately by the shiftable transmission one has the same positioning options as in the embodiment of FIG. 1 and following, but somewhat more slowly. Basically, however, it is of course also conceivable to operate three supports 3 by means of one servo-motor 17, for example, so that one can make do with only two servo-motors 17.

FIGS. 11-13 show another embodiment of a hexapod 1 of the invention. Once more, it has six separate supports 3, on which again one mounting 8 each is arranged on the inside of the support, corresponding basically to the mounting 8 of the first example embodiment. Again here the supports 3 are configured as rings. The joints 12 here are universal joints, as are the joints 14 at the receptacle 15, while in the example shown two braces 13 (each designed as double braces) are arranged at a common joint 14 or point.

The pivoting of the six supports 3 in the example embodiment shown takes place on a total of three pillow blocks 34, each having several rollers 21, there being a total of six rollers 21 in the example shown. The pillow blocks 34 are arranged equidistant in the area of the outside of the supports 3, being positioned at a 120° offset from each other on the hexapod housing 2 (which can also be a frame or the like). The individual supports 3 are pivoted on or at the rollers 21, for which the supports 3 have a corresponding outer profile, so that they can slide against the rollers 21. In any case, this "three-point bearing" realizes a complete pivoting of each individual support 3.

To drive the individual supports 3, which again can be driven separately and consequently the individual mountings 8 can travel along a circular path, a total of six separate driving means 16 in the form of servo-motors 17 are provided once again. These motors are again disposed in stationary fashion on the housing 2. The driving of the supports in the example shown occurs each time by a belt 22, which is wrapped around the outside of the respective support 3. Since the supports 3 are arranged one above another, and consequently positioned in different horizontal planes, the servo-motors 17 also are arranged with a vertical offset (also see embodiment 1 per FIGS. 1-9 and embodiment 2 per FIG. 10). As a result, the corresponding belts 22 also necessarily run in the different horizontal planes. Since the servo-motors 17 here are also stationary, any given 360° rotations are possible, without the risk of cable coiling (of course, each servo-motor 17 is connected by suitable cable connections to the already described control mechanism, etc.). Each belt 22 can be designed as a toothed belt, in which case the outer surface of the respective support 3 likewise has a toothing. But it is also conceivable that the belt and also the outside of the support has no profiling.

FIG. 14 shows another configuration and bearing possibility for the individual supports 3, which is possible in a hexapod that has, say, a belt drive, as described in FIGS. 11-13, although it can also be used for other hexapod types. In the example shown, each support 3 has an inwardly directed bearing arm 23, while all bearing arms end at the center of the rings and are mounted on a common central pillow block 24 by suitable bearing means, such as rolling bearings, rollers or the like. For this, each bearing arm has a suitable bearing aperture, which itself forms the outer race of a rolling bearing, for example, or into which such an outer race or the rolling bearing itself is fitted, etc. In any case, a simple pivoting is provided by this inner pillow block. Moreover, fastening receptacles 25 are provided on each support arm, each for a separate mounting 8, not shown otherwise here. The latter can thus be connected to the respective ring-shaped support 3 solidly in rotation. Instead of a belt drive, of course a gear drive is also possible, as in the first embodiment per FIG. 1 and following.

FIGS. 15-17 show another embodiment of the hexapod 1 of the invention, in which—unlike the example embodiments described thus far—the driving means 16 are arranged on the inside, and thus the individual supports 3 are driven from the inside. Once again, a hexapod housing 2 and six supports 3 are provided here. Each support 3 is arranged so it can turn via suitable bearing means 6, such as axial ball bearings, on an inner structure consisting of separate, stationary bearing rings 26. That is, the bearing rings 26 form a stationary inner bearing or supporting structure on which the individual supports 3 are pivoted via the bearing means 6, i.e., the axial bearing rings. On the inner supporting structure formed from the bearing rings 26, the six driving means 16 in the form of individual servo-motors 17 are arranged in the example shown. Each bearing ring 26 has a recess 27, through which the takeoff pinion 32 of each servo-motor 17 reaches and meshes with the inner toothing 20 of each support 3 by 2 intervening gears 19 in the example shown (see FIG. 16, where the upper, individually depicted parts are only shown "loose" due to the cross sectional drawing). The servo-motors 17 are obviously arranged in different height positions, so that the different horizontal planes can be adjusted in regard to the tooth engagement. In this way, it is again possible to move each support 3 individually by an unmoved drive system arranged inside the frame 2 and comprising six servo-motors 17.

On the outside of each support 3 there is arranged a mounting 8, solidly in rotation, for which a radially outwardly pointing projection 28 is provided on each support 3—see the sectional view per FIG. 17—on which the respective mounting 8 is fastened. In operation, the mountings 8 consequently move along the outer periphery of the ring structure.

Due to the stationary arrangement of the servo-motors 17 and the fastening of each mounting 8 to a separate support 3, unlimited 360° rotations are again possible, at the same time as extremely flexible positioning possibilities.

FIG. 18 shows, as a diagram, another embodiment of a hexapod 1 according to the invention. Here, once more, six carriers 3 are provided, configured as rings, but decreasing in radius from outside to inside and arranged concentrically within each other in a single horizontal plane. Once again, the receptacle 15 is articulated by its six braces or rods 13 to a support 3 in the manner already described, but here the braces 13 are necessarily of different length, due to the radial layout. The supports 3, once again, are able to move separately about the central axis of rotation in the middle, for which once again six separate stationary driving means 16 are provided in the form of servo-motors 17. In the example shown, these are arranged underneath the plane of the supports 3 and therefore cannot be seen. For example, each support 3 has a toothing on its underside, which cooperates with a servo-motor 17, which can occur either directly via the takeoff pinion or an intervening gear, or by a flexible drive shaft, for example, so that an arrangement of the individual servo-motors 17 at the side of the support layout is also possible, if this is required due to space considerations.

FIG. 19 shows an example embodiment of a hexapod 1 according to the invention in the form of a diagram where once again six separate supports 3 are provided. But these describe any given asymmetrical contour, and in the example shown the basic contours of the individual supports 3 are the same, but the supports 3 differ in size. For example, they are arranged inside each other in the same horizontal plane. Each support 3 is configured as a guide rail defining a closed path, but it is stationary—unlike the previously described embodiments. The individual mountings 8, by which the receptacle 15 is coupled to the respective supports 3 by its braces 13, are able to move along the stationary supports 3 in this embodiment. For this purpose, the mountings 8 are designed as carriages or trucks and they travel along the top side of the supports; thus, the supports 3 dictate the path of movement. In order for the mountings 8 to be able to move, the supports 3 are designed as hollow profiles, so that a separate traction means such as a belt or a chain can run inside each support 3. A diagram is shown in the enlarged detail of FIG. 19. Thus, the traction means 35 works inside a support 3, but it can be led out from the support 3 at one point for connection to a driving means in the form of a servo-motor, not otherwise shown here. But the motor can also reach with a takeoff pinion into the guide rail and engage with the chain. The mounting 8 itself is designed as a carriage or truck and connected by a connecting pin 29 or the like in the traction means 35. If the traction means 35 is moved in the support 3, the mounting 8 which is movably placed on the support by a rolling bearing or a sliding bearing or the like is moved along the support 3.

Since the supports 3 in the example embodiment 19 shown—which of course is in no way limiting for the support shape, but instead any given support contours are conceivable—have a contour deviating from a circular path, once again totally different positioning options necessarily result from the path geometry.

FIGS. 20 and 21 show another example embodiment of a hexapod 1 according to the invention in the form of diagrams. Here, each support 3 is designed as an elongated brace, each of which can turn about a separate axis of rotation 30. In the example shown, the axes of rotation 30 are arranged staggered from each other; for example, they all lie on the same radius and are spaced apart equidistant from each other by 60°. For each support 3 its movement path 31 is shown, i.e., a circular path. At the respective end of a support 3 is situated the respective mounting 8, on which the respective brace 13 is fastened, leading to the receptacle 15. For the positioning of the receptacle 15, driving means not otherwise shown, here being servo-motors once again, swivel the individual supports 3 about their respective axis of rotation 30 into any desired position, so that the corresponding mounting 8 and, by this, the brace 13 is also necessarily moved.

Although the option exists to move each of the bracelike supports 3 in a horizontal plane, and preferably the individual horizontal planes are vertically staggered relative to each other so that the supports 3 do not run into each other, in the example embodiment shown in FIG. 21 the supports 3 are arranged tilted in space, so that paths or movement planes that are likewise tilted in space result. That is, a lifting and lowering motion occurs in the case of a 360° rotation of a support 3.

Although FIGS. 20 and 21 describe an equidistant, symmetrical arrangement of the axes of rotation 30, it is of course conceivable to have these distributed otherwise in space. It is also conceivable for the mountings 8 as well to be movable along the supports 3, to further enhance the positioning flexibility.

Finally, it should also be noted that instead of rings, the supports can also be configured as ring sections or ring segments. For example, a ring segment may describe 120° or 180°. Such ring segments can be arranged vertically one above another, for example, as in the embodiment of FIG. 1 and following, but they can also be positioned staggered about the central axis of rotation. Accordingly, the individual servo-motors 17 are also staggered. This configuration likewise enables a positioning of the receptacle, but then no 360° rotations are possible, of course.

The hexapod of the invention in its different embodiments (of course, the example embodiments shown are in no way limiting) enables a highly accurate and highly flexible positioning of the receptacle 15. Any given implements can be arranged on the receptacle 15. These can be small and miniature implements, for example, surgical and working means to be used in medical technology, or tools and tool holders to be used in machining, through to large structures such as telescopes or satellite dishes or simulators such as flight simulators, helicopter simulators or automobile simulators. Consequently, its use is possible wherever a movement about six—or with the hexapod of the invention even seven—degrees of freedom is required and especially where 360° rotations are required in any desired number.

The invention claimed is:

1. A hexapod, comprising a receptacle, on which at least five rods mounted in separate joints are arranged, wherein the other end of each rod is articulated on a separate mounting, wherein all the mountings can be moved along a path of movement, characterized in that each mounting (8) is arranged on a separate support (3), and either the respective mounting (8) is movable along the respective support (3) or the respective support (3) is movable together with the associated mounting (8), where a support (3) is a ring or a ring section or has a two-dimensionally or three-dimensionally convoluted spatial form, defining a closed or open path of movement.

2. The hexapod according to claim 1, characterized in that the supports (3) are arranged in a same horizontal plane, in parallel horizontal planes, or tilted relative to each other.

3. The hexapod according to claim 1, characterized in that the rings or ring sections are arranged concentrically one above the other or concentrically within each other, or in that the rings or ring sections are arranged vertically and radially staggered from each other.

4. The hexapod according to claim 1, characterized in that each support (3) or each mounting (8) is separately movable by its own stationary driving means (16), or in that two of the supports (3) or two of the mountings (8) are coupled together in movement so that they can be moved via a shared stationary driving means (16).

5. The hexapod according to claim 4, characterized in that said each support (3) has a toothing (20), which meshes with a takeoff element (18, 19, 22) driven by a stationary motor (17).

6. The hexapod according to claim 5, characterized in that, in the case of the rings or ring sections lying concentrically one above another, the toothings (20) are provided on the outside or inside, and for rings or ring sections lying in one or more different, possibly tilted, horizontal planes, the toothing (20) is provided on the underside.

7. The hexapod according to claim 6, characterized in that the mounting (8) can be moved with a traction means (28) led along the support (3) and coupled to the motor.

8. The hexapod according to claim 7, characterized in that the mounting (8) is configured as a carriage.

9. The hexapod according to claim 1, characterized in that the supports (3), especially the rings or ring sections, are mounted via bearing means (6) on one or more stationary structural parts, or in that they are mounted by the bearing means (6) arranged between them.

10. The hexapod according to claim 9, characterized in that the supports (3), especially the rings or ring sections, each have a bearing arm (23), and all bearing arms (23) are mounted via the bearing means on a common central pillow block (24).

11. The hexapod according to claim 9, characterized in that the rings are concentric rings of a same diameter mounted with their outsides on at least three pillow blocks (24) by respective bearing means at a block side.

12. The hexapod according to claim 1, characterized in that a common control mechanism (19) that controls all driving means (16) is provided.

13. A hexapod, comprising a receptacle, on which at least five rods mounted in separate joints are arranged, wherein the other end of each rod is articulated on a separate mounting, wherein all the mountings can be moved along a path of movement, characterized in that each mounting (8) is arranged on a separate support (3), and either the each mounting (8) is movable along the respective support (3) or the respective support (3) is movable together with the each mounting (8), wherein the respective support (3) is a pivot-mounted brace, and the pivot-mounted braces of the respective supports are pivot-mounted to turn about a common axis of rotation (30) or about separate axes of rotation, staggered from each other.

* * * * *